United States Patent
Bengs et al.

(10) Patent No.: US 6,313,105 B1
(45) Date of Patent: Nov. 6, 2001

(54) THERMOPLASTIC MIXTURES CONTAINING DIALDEHYDE STARCH AND NATURAL POLYMERS

(75) Inventors: Holger Bengs, Frankfurt; Arnold Schneller, Messel; Gitte Böhm, Frankfurt; Silke Schuth, Ruppach-Goldhausen; Jürgen Grande, Bad Soden, all of (DE)

(73) Assignee: Aventis Research and Technologies GmbH & Co KG (DE)

( * ) Notice: Subject to any disclaimer, the term of this patent is extended or adjusted under 35 U.S.C. 154(b) by 0 days.

(21) Appl. No.: 09/462,525
(22) PCT Filed: Jun. 26, 1998
(86) PCT No.: PCT/EP98/03921
  § 371 Date: Mar. 13, 2000
  § 102(e) Date: Mar. 13, 2000
(87) PCT Pub. No.: WO99/02599
  PCT Pub. Date: Jan. 21, 1999

(30) Foreign Application Priority Data

Jul. 9, 1997 (DE) .............................................. 197 29 269

(51) Int. Cl.$^7$ ............................. A61K 31/70; C08B 63/48
(52) U.S. Cl. ........................................... 514/60; 525/54.24
(58) Field of Search ................................... 525/54.1, 54.2, 525/54.21, 54.24, 54.3, 54.31; 514/60

(56) References Cited

U.S. PATENT DOCUMENTS 5,397,834 * 3/1995 Jane et al. ............................ 525/54.1

FOREIGN PATENT DOCUMENTS 0530987   3/1993  (EP) .
0599535   6/1994  (EP) .

OTHER PUBLICATIONS

Takashi Tsuchida, et al. *Chemical Abs.* 90: 207201, XP–002083060, (Jun. 25, 1979).

* cited by examiner

*Primary Examiner*—Elli Peselev
(74) *Attorney, Agent, or Firm*—Connolly Bove Lodge & Hutz LLP

(57) ABSTRACT

Homogeneous mixtures are described and can be processed to give shaped biodegradable and physiologically nonhazardous articles, such as packagings for food or drink or pharmaceutical products, sausage casings and the like. The mixtures comprise dialdehyde starch with a degree of oxidation of greater than 30%, starch which does not exhibit any iodine-starch reaction, and/or modified starch, water and other plasticizers, and also, if desired, other biopolymers and additives.

15 Claims, No Drawings

THERMOPLASTIC MIXTURES CONTAINING DIALDEHYDE STARCH AND NATURAL POLYMERS

The invention relates to mixtures which can be thermoplastically processed to give shaped biodegradable articles and which comprise, as components, dialdehyde starch, starch or modified starch, if desired also other polymers, in particular biopolymers, such as proteins, and also plasticizers and, if desired, conventional additives, such as antioxidants, mold-release agents, lubricants, dyes and the like. The invention further relates to the use of these mixtures for producing shaped articles which may be used in particular in the sectors of food and drink and pharmaceutical products.

Constantly growing environmental awareness, and also ever stricter regulations relating to waste disposal or recycling, have led to a marked increase in efforts to utilize biodegradable materials for producing shaped articles. Increasing efforts are also being made, wherever possible, to use materials and in particular polymers based on renewable raw materials instead of materials based on mineral oil. Substances from natural sources are moreover in many cases less physiologically hazardous.

Starch, and also modified starch, alone or else mixed with other polymers, in particular with biopolymers, are renewable raw materials which are of constantly increasing importance, especially for producing shaped articles, e.g. foils or films. Processors encounter a wide variety of problems here. To process starch, modified starch or else mixtures with other polymers by shaping, very intimate mixing is required, i.e. homogenization of the components, in particular if the materials are to be processed thermoplastically. It is also important that during the shaping process the mixture has been adequately plasticized, in order to avoid having to accept excessively high shaping temperatures and the associated decomposition of the components. The shaped article moreover should have not only good biodegradability but also highly homogeneous internal structure and good mechanical properties, such as strength and elasticity. A particular further requirement for most applications is very low brittleness and abrasion. The plasticizer should also be environmentally friendly, i.e. biodegradable, and preferably physiologically nonhazardous.

Some publications are known concerning molded compositions based on starches and on proteins with dialdehyde starch as an additive.

In DE-A 1470882, for example, a process is described for producing transparent films for packaging food or drink. Here, from 2 to 50% of protein and from 5 to 70% of a plasticizer in aqueous solution at from 22 to 50° C. are mixed with from 0.01 to 20% by weight, based on the dry substances, of a dialdehyde polysaccharide, e.g. dialdehyde starch. The dialdehyde starch serves to crosslink the protein. Free amino groups in the protein react with the aldehyde groups. This process is awkward and requires a great deal of energy since about ten times the amount of water, based on protein, is used in the production of the films, and this has to be evaporated. In addition, there are two curing steps U.S. Pat. No. 5,397,834 describes a composition made of from 10 to 35% by weight of protein and from 65 to 70% by weight of aldehyde starch. To prepare compositions of this type, from 0.5 to 2 parts of protein are dissolved in from about 2 to 6 parts of a solubilizing solvent, e.g. a 75% strength aqueous ethanol solution. This solution is then mixed with from 2 to 8 parts of an aldehyde starch. The aldehyde starch is to have a low degree of oxidation, preferably from 10 to 20%, to ensure effective crosslinking of the protein and of the aldehyde starch. After the mixing, the solvent is evaporated. This procedure again leads to crosslinked materials which are not suitable for thermoplastic further processing.

WO 93/19125 describes mixtures made from starch or, respectively, modified starch and from proteins, in which crosslinking agents, inter alia dialdehyde starch, are also used. Here, again, these are materials which are not within the scope of the present invention.

U.S. Pat. No. 4,220,264 describes the production of shaped articles, such as foils, from amylose and amylose starch, with concomitant use of crosslinking agents and of a liquid, such as dimethyl sulfoxide. The amount of the liquid needed is from about 10 to 20 times that of the starch used. The foils obtained in Examples 11 and 12, in which dialdehyde starch is used as crosslinking agent, are all easily fractured.

Finally, EP-A1-0 599 535 describes a process in which extrusion is used to shape mixtures composed of starch and of a starch degradation product, such as a starch hydrolysis product with DE (dextrose equivalent) values of from 1 to 40, and of oxidized starches and of pyrodextrins. The oxidized starches used here exhibit the typical starch color reaction with iodine. This is a clear indication that the hydroxymethylene group of the starch has been oxidized, or the degree of oxidation of a dialdehyde starch is only very low.

Although there is a wide variety of known processes and compositions for producing shaped articles in which dialdehyde starch is used, there remains a need for improved processes and improved compositions which allow the production of moldings which have good and improved properties and are versatile in use.

It is therefore an object of the invention to provide compositions which comprise dialdehyde starch and at least one other biodegradable component based on starch or on modified starch, and also comprise plasticizers and, if desired, other biopolymers, and also other conventional additives, which can be produced simply and cost-effectively and are thermoplastically processable to give shaped articles with industrially useful properties, which do not have the disadvantages which arise in the crosslinking of starch components, and which are homogeneous and which give shaped articles with a homogeneous structure.

This object is achieved by a thermoplastic mixture as claimed in patent claim 1.

Other advantageous embodiments are described in claims 2 to 10. The invention also provides a process as claimed in patent claims 11 to 13. Advantageous uses are given in patent claims 14 to 18.

A group of starches which can be used for the purposes of the invention comprises the starches obtained from vegetable raw materials. These include starches made from tubers, such as potatoes, cassava, maranta or sweet potato, from seeds, such as wheat, corn, rye, rice, barley, millet, oats or sorghum, from fruits, such as chestnuts, acorns, beans, peas and other pulses or bananas, or from plant pith, for example of the sagopalm.

The starches which can be used for the purposes of the invention are composed substantially of amylose and amylopectin in varying proportional quantities.

Particularly good results are achieved with, inter alia, starches made from potatoes (e.g. ®Toffena from Südstärke) or corn (e.g. Maize Starch from National Starch), or else from polyglucans, which feature a perfectly linear structure of the polymers.

The molecular weights of the starches which can be used according to the invention may vary over a wide range. The starches which can be used as a basis for the novel thermoplastic mixture are those which are composed substantially of a mixture of amylose and amylopectin, with molecular weights $M_w$ within the range from $5 \times 10^4$ to $1 \times 10^7$. Preference is given to relatively long-chain polymers with molecular weights $M_w$ of from $1 \times 10^6$ to $5 \times 10^6$.

Preference is also given to linear starches, preferably polyglucans, in particular 1,4-α-D-polyglucan, with molecular weights $M_w$ within the range from $5 \times 10^2$ to $1 \times 10^5$, preferably with molecular weights $M_w$ of from $1 \times 10^3$ to $5 \times 10^4$.

Besides molding compositions based on starches of native vegetable origin, the invention also includes thermoplastic mixtures or molding compositions with starches which have been chemically modified, have been obtained by fermentation, are of recombinant origin or have been prepared by biotransformation (biocatalysis). The term "biocatalysis" is also used as a synonym for "biotransformation".

For the purposes of the present invention, "chemically modified starches" are starches whose properties have been altered from their natural state by chemical means. This is achieved substantially by polymer-analogous reactions in which starch is treated with mono-, bi- or polyfunctional reagents and/or oxidants. The hydroxyl groups of the polyglucans of the starch are preferably transformed here by etherification, esterification or selective oxidation, or the modification is based on a free-radical-initiated graft copolymerization of copolymerizable unsaturated monomers onto the starch backbone.

Particular chemically modified starches include starch esters, such as xanthogenates, acetates, phosphates, sulfates and nitrates, starch ethers, e.g. nonionic, anionic or cationic starch ethers, oxidized starches, such as dialdehyde starch, carboxy starch, persulfate-degraded starches and similar substances.

For the purposes of the present invention, "fermentative starches" are starches obtained by fermentative processes, or with the involvement or assistance of fermentative processes, using naturally occurring organisms, such as fungi, algae or bacteria. Examples of starches from fermentative processes are gum arabic and related polysaccharides (gellan gum, ghatti gum, karaya gum, gum tragacanth), xanthan, emulsan, rhamsan, wellan, schizophyllan, polygalacturonates, laminarin, amylose, amylopectin and pectins.

For the purposes of the present invention, "starches of recombinant origin" or "recombinant starches" are specifically starches which can be obtained by fermentative processes, or with the involvement or assistance of fermentative processes, using organisms which do not occur in nature, but with the aid of natural organisms modified by genetic engineering, for example fungi, algae or bacteria. Examples of starches from fermentative processes using genetically engineered modifications are amylose, amylopectin and polyglucans.

For the purposes of the present invention, "starches prepared by biotransformation" are starches, amylose, amylopectin or polyglucans prepared by a catalytic reaction of monomeric fundamental building blocks, generally of oligomeric saccharides, in particular of mono- or disaccharides, by using a biocatalyst (or: enzyme) under specific conditions. Examples of starches from biocatalytic processes are polyglucan and modified polyglucans, polyfructan and modified polyfructans.

Finally, advantageous thermoplastic mixtures may also be obtained using derivatives of the individual starches mentioned. For the purposes of the present invention, "derivatives of starches" and "starch derivatives" very generally are modified starches, i.e. starches whose properties have been altered by changing the natural amylose/amylopectin ratio or carrying out a pregelatinization, a partial hydrolytic degradation or a chemical derivatization.

The destructured starches which can be used for the purposes of the invention include those which, for example, have been homogenized using glycerol so that crystalline reflections can no longer be seen in X-ray diffraction and starch grains or birefringent regions can no longer be seen under a polarizing microscope at a magnification of one thousand. In this connection reference is made to DE-A1-3931363, the disclosure of which is expressly incorporated herein by way of reference.

The plasticizers used as in the teaching of patent claim 3 are mostly commercially available products, e.g. gluconic acid or glucuronic acid, galacturonic acid, or else the sugar acids. They may also be prepared from the carbohydrate sugars by appropriate oxidation. In this connection reference is made to Lehrbuch der Organischen Chemie [Organic Chemistry Textbook] by Beyer, Walter, S. Hitzel Verlag, Stuttgart, 1991, 22nd edition, pages 431–432, paragragh 2. This disclosure is expressly incorporated herein by way of reference.

The other polymers which may be used concomitantly include especially proteins, such as vegetable proteins, e.g. sunflower protein, cottonseed protein and the like, and also plasma protein, egg white and the like.

For the purposes of the invention, one or more plasticizers may be used. The ideal plasticizer content on any occasion depends on the other components and can readily be determined for each specific formulation.

For the purposes of the present invention, the terms plasticizing agent, plastification agent, plastifying agent and elastifying agent mean fundamentally the same as the term plasticizer.

Use may be made of any inert, preferably organic, substance which generally has a low vapor pressure and which interacts with components (A) and, where appropriate, (B) or (E), and forms a homogeneous system with these without any chemical reaction and preferably via its solvent or swelling power, or else in the absence of these.

Component D) to be used according to the invention preferably lowers the freezing point of the mixture, increases its deformability, enhances its elastic properties, reduces its hardness and, if desired, raises its adhesion.

According to the invention, preferred plasticizers are odorless, colorless, resistant to light, cold and heat, not more than slightly hygroscopic, resistant to water, not hazardous to health, flame-retardant and as involatile as possible, of neutral reaction, and miscible with polymers and with auxiliaries, and have good gelling performance. In particular, they should have compatibility, gelling capability and plasticizing action with respect to components A) and, where appropriate, B).

The components to be used according to the invention as component D) should also feature low migration, and this is particularly important for applications of the shaped articles according to the invention in the food and drink sector.

Examples of particularly preferred plasticizing components D) are dimethyl sulfoxide, 1,3-butanediol, glycerol, ethylene glycol, propylene glycol, diglyceride, diglycol ether, formamide, N,N-dimethylformamide, N-methylformamide, dimethylacetamide, N-methylacetamide and/or N,N'-dimethylurea.

Other particularly useful materials are polyalkylene oxide, glycerol mono-, di- or triacetate, sorbitol and other sugar alcohols, such as erythritol, saccharides, such as glucose, fructose or sucrose, and also citric acid and its derivatives.

Component E) is an optional component in the novel mixture. It may be one or more substances.

Conventional additives include fillers and lubricants other than the plasticizers mentioned under D), flexibilizing agents, pigmenting agents, dyes, mold-release agents and others.

Examples of suitable fillers are synthetic polymers which are virtually soluble in the mixture, for example lactic-acid-based polymers, such as ®Lacea from Mitsui, ®Resomer from Boehringer Ingelheim, and also other lactic-acid-based polymers and similar lactic-acid polymers, from Wako Pure Chemical Industries Ltd., Medisorb Co., Birmingham Polymers Inc., Polysciences Inc., Purac Biochem BV, Ethicon, Cargill or Chronopol, where this list clearly cannot be absolutely comprehensive, or blends of synthetic polymers with natural polymers, e.g. Mater-Bi from Novamont.

The addition of at least one inorganic filler, such as magnesium oxide, aluminum oxide, $SiO_2$, $TiO_2$, etc., is also proposed.

For pigmenting the mixture, organic or inorganic pigments are particularly suitable, as are, in particular, so-called pearl-luster pigments which are biocompatible, i.e. can be classified as nonhazardous to living organisms, these are based primarily on silicate structures and can therefore in principle be classified as edible, and are used in amounts of from 0.001 to parts by weight.

Materials particularly suitable for improving flow properties are animal or vegetable fats and/or lecithins, preferably used in hydrogenated form. These fats and other fatty acid derivatives preferably have a melting point above 50° C.

The dialdehyde starch used for the purposes of the invention is obtained by oxidizing starch. The C2–C3 bond in the repeat unit, i.e. in the glycose building block, is cleaved here and on each occasion gives an aldehyde group. The degree of oxidation of a dialdehyde starch describes the percentage proportion of the glucose units opened up in this way, based on the total number of glucose units present, i.e. degree of oxidation (oxidized glucose repeat units in starch: total of all glucose units in starch, whether cleaved or not) multiplied by 100.

Preparation methods are described, inter alia, in WO 95/12619 and in Starch Production Technology, J. A. Radley (ed.), Appl. Sci. Barking (1976), pp. 423 et seq.

It was particularly surprising that according to the invention shaped articles are obtainable which not only have a homogeneous structure but also have increased water-resistance together with good elasticity. The moldings are not brittle, or their level of brittleness is very low. The compositions may be processed thermoplastically without difficulty, e.g. by extrusion or by injection-molding methods. They are physiologically nonhazardous and may therefore be used in immediate contact with food or drink.

The novel thermoplastic molding composition may be processed by known processing methods to give products. For example, in a first step it may be pelletized.

The invention therefore also provides pellets which can be obtained from the thermoplastic mixture according to the invention by extrusion and pelletization. It is also possible, either directly or by further thermoplastic processing of thermoplastic pellets, to obtain moldings or films with good biodegradability and improved mechanical properties.

Finally, the invention also includes the use of the thermoplastic mixtures for producing moldings or films.

The novel products therefore cover a wide variety of possible applications. These include, specifically, adhesives for paper and corrugated board, shaped articles produced by injection molding, especially rods, tubes, bottles, capsules, pellets, additives for food or drink, foils, in the form of coatings or free-standing foils, also in the form of laminates, especially films, packaging materials, bags, and release-slowing materials for the controlled release of active substances in general, in particular drugs, pesticides or other active substances used in agriculture, fertilizers, flavorings, etc. The release of the active substance here may take place from foils, films, tablets, particles, microparticles, rods or other extrudates or other shaped articles.

More preferred applications include packaging for food or drink, in particular sausage casings or cheese wrappings, absorbers, powders and the like.

In a particular embodiment, the novel thermoplastic mixtures are used to produce shaped articles for the controlled release of active substances, for example tablets or dragees.

Another expedient and particularly advantageous use of the novel thermoplastic mixture relates to the production of shaped articles which are suitable for producing solid shaped articles, hollow articles or combinations of these.

Another excellent use of the novel thermoplastic mixture is for producing films for use in agriculture.

Another particular variant of the invention is the use of the thermoplastic mixture for producing films for use in food or drink applications.

Another specific use of the thermoplastic mixture is for producing films for use as an outer package for surrounding food or drink.

One more highly advantageous use of the novel thermoplastic mixture is in producing films for use as packaging for food or drink where there is full surface contact between the packaging and the food or drink.

A final particularly advantageous use of the novel thermoplastic mixture is in producing flat or tubular films for use as food casings or wrappings for sausages or cheese.

For the purposes of the present invention preference is also given to the use of the thermoplastic mixture as temporary protective films for technical consumer articles.

The examples below illustrate the subject matter of the invention.

EXAMPLE 1

Synthesis of Dialdehyde Starch 162 g (1 ml) of a potato starch (Toffena from Südstärke) are suspended in 2 l of water and placed in a 5 l reaction vessel with a stirrer. 10.7 g (0.05 mol) of sodium periodate (e.g. Aldrich) are added. The reaction mixture is set to pH 3–4. The solution obtained after a short period is stirred for a further hour at room temperature. The oxidized starch formed is isolated by precipitation in a water-ethanol mixture, and dried at about 40° C. in vacuo. As determined by the oxidizing agent used and the equation on which the reaction is based ($1CHOH-CHOH+1IO_4=1CHO-CHO+1IO_3+1H_2O$), a degree of oxidation of 5% is obtained.

EXAMPLE 2

Synthesis of Dialdehyde Starch Under Catalytic Conditions

Catalytic amounts of periodate are used in the electrochemical process of WO 97/12619 to prepare a variety of degrees of oxidation, i.e. a variety of dialdehyde starches. An appropriate apparatus and the procedure are described in more detail in WO 95/12619. Depending on the duration of the reaction, the degree of oxidation is set at values of from 30 to 85%.

EXAMPLE 3

Preparation of a Thermoplastically Processable Blend Made from Starch and from a Dialdehyde Starch Using a Kneading Assembly The compounds are prepared in a commercially available kneading assembly (Brabender kneader). The kneading assembly is heated to 100° C. 30 g of potato starch (Toffena from Südstärke) and 3 g of dialdehyde starch (about 90% degree of oxidation, Aldrich) are added to the kneading assembly in its operating condition. 15 g of water are then added and homogenized with the initial charge of polymer. After about 3 minutes, 9 g of glycerol are added. After a further 3 minutes, 0.3 g of glyoxal (40% strength solution) is added all at once. After a further 2 minutes, the experiment is ended. The thermoplastic material is immediately removed. It is a homogeneous product. The foils produced from this material by a compression-molding process are transparent, very homogeneous and highly flexible.

EXAMPLE 4

Preparation of a Thermoplastically Processable Blend Made from Starch and from a Dialdehyde Starch Using a Kneading Assembly The compounds are prepared in a commercially available kneading assembly (Brabender kneader). The kneading assembly is heated to 100° C. 50 g of corn starch (Maize Starch from National Starch) and 2.5 g of dialdehyde starch (about 90% degree of oxidation, Aldrich) are added to the kneading assembly in its operating condition. 25 g of water are then added and homogenized with the initial charge of polymer. After about 3 minutes, 15 g of glycerol are added. After a further 3 minutes, 0.5 g of glyoxal (40% strength solution) is added all at once. After a further 2 minutes, the experiment is ended. The thermoplastic material is immediately removed. The product is white and hard. The foils produced from this material by a compression-molding process are homogeneous, flexible and transparent to opaque.

EXAMPLE 5

Preparation of a Thermoplastically Processable Blend Made from Starch and from a Dialdehyde Starch Using a Kneading Assembly The compounds are prepared in a commercially available kneading assembly (Brabender kneader). The kneading assembly is heated to 100° C. 30 g of potato starch (Toffena from Südstärke) and 3 g of dialdehyde starch (about 70% degree of oxidation, Aldrich) are added to the kneading assembly in its operating condition. 15 g of water are then added and homogenized with the initial charge of polymer. After about 3 minutes, 12 g of glycerol are added. After a further 2 minutes, the experiment is ended. The thermoplastic material is immediately removed. It is a flexible and transparent product. The foils produced from this material by a compression-molding process are transparent, flexible and highly homogeneous.

EXAMPLE 6

Preparation of a Thermoplastically Processable Blend Made from Starch and from a Dialdehyde Starch Using a Kneading Assembly The compounds are prepared in a commercially available kneading assembly (Brabender kneader). The kneading assembly is heated to 100° C. 30 g of a cationic starch (Cato 245 from National Starch) and 3 g of dialdehyde starch (about 90% degree of oxidation, Aldrich) are added to the kneading assembly in its operating condition. 15 g of water are then added and homogenized with the initial charge of polymer. After about 5 minutes, 9 g of glycerol are added. After a further 5 minutes, the experiment is ended. The thermoplastic material is immediately removed. The product is white and homogeneous. The foils produced from this material by a compression-molding process are transparent, slightly yellowish, homogeneous, flexible and have slightly adhesive properties. The film thickness is in the region of 120 +/−20 mm.

EXAMPLE 7

Description of the Production of Films from Thermoplastic Materials Based on Starch Using a Compression-molding Technique The compression-moulding technique described here is used to process thermoplastic molding compositions to give films. A commercially available Schwabenthan (Polystat 300 S) press is used. The press is preheated to 100° C. The preparation of the specimens uses a "sandwich technique" between two fabric-reinforced Teflon sheets held apart by a metal frame of about 100 μm thickness. During the preparation about 2 g of the composition prepared in the kneader are placed in the middle of the lower sheet. The specimen is held for 5 minutes at a temperature of 100° C. and a pressure of 1 t. The specimen is then compression-molded at 100° C. for 5 minutes, at a pressure of 10 t. This corresponds to a pressure of 200 bar.

The pressure is released and the specimen is transferred to another press for cooling. This is a water-cooled press from Robert Fuchs Hydraulische Maschinen und Werkzeuge. A pressure of 50 bar is applied during the cooling procedure for a period of 2 minutes.

EXAMPLE 8

Method for Determining the Water-resistance of Films Made from Biopolymers and Mixtures of These.

To investigate water absorption and swelling behavior, sections of 1 cm×1 cm size were cut out from the film to be studied. To ensure comparability with other specimens, care should be taken that the areas used for the study are particularly homogeneous. The two pieces of film are studied once at room temperature (water bath, 20° C., 4 h) and once at elevated temperature (water bath, 80° C., 2 h), i.e.
A) film 1: water bath 20° C. 4 h
B) film 2: water bath 80° C. 2 h.

The pieces of film are then evaluated on a graded scale from 0 to 5, where "0" corresponds to complete dissolution of the film and "5" is the evaluation for a condition in which the naked eye can detect no external effects.

TABLE I

Complete evaluation system for assessing the water-resistance of films made from thermoplastic molding compositions comprising dialdehyde starch

| Evaluation number | Description |
|---|---|
| 0 | complete dissolution of the film |
| 1 | film broken up into small flakes/crumbs |
| 2 | swollen, soft, milky |
| 3 | soft, milky |

TABLE I-continued

Complete evaluation system for assessing the water-resistance of films made from thermoplastic molding compositions comprising dialdehyde starch

| Evaluation number | Description |
| --- | --- |
| 4 | change just detectable with the naked eye, not swollen, not milky |
| 5 | no external effects detectable with the naked eye |

TABLE II

Summary and assessment of the films made from thermoplastic molding compositions comprising dialdehyde starch

| Starch | Dialdehyde starch (%) | Water (%) | Glycerol (%) | Glyoxal (%) | Condition of film | A* | B* |
| --- | --- | --- | --- | --- | --- | --- | --- |
| potato | 10 | 50 | 50 | 0 | soft; elastic; translucent | 5 | 2 |
| potato | 10 | 50 | 50 | 10 | soft; elastic; transparent; slightly tacky | 4 | 1–2 |
| potato | 30 | 50 | 50 | 0 | soft; flexible; cracking; stable | 5 | 1 |
| potato | 30 | 50 | 50 | 10 | soft; flexible | 5 | 1–2 |
| corn | 10 | 30 | 15 | 0 | brown; cracking; adheres immediately to PTFE film | 5 | 2–3 |
| corn | 30 | 30 | 15 | 0 | soft; flexible; stable; brown | 5 | 3 |
| corn | 30 | 30 | 15 | 10 | soft; flexible; stable; brown | 5 | 3 |

The potato starch used was Toffena from Südstärke.
The corn starch used was Maize Starch from National Starch.
The glyoxal data are based on the percentage by weight of a 40% strength aqueous solution.
A* assessment of water-resistance after 4 h at room temperature
B* assessment of water-resistance after 2 h at 80° C.

EXAMPLE 9
(Comparative Examples)

The thermoplastic molding compositions without dialdehyde starch were prepared as in Example 3 and below, and the films molded therefrom as in the description under Example 7.

TABLE III

Summary and assessment of the films made from thermoplastic molding compositions without dialdehyde starch

| Starch | Dialdehyde starch (%) | Water (%) | Glycerol (%) | Glyoxal* (%) | A* | B* |
| --- | --- | --- | --- | --- | --- | --- |
| potato | 0 | | 50 | 50 | 0 | 2 | 1 |
| potato | 0 | | 50 | 50 | 10 | 2–3 | 1 |
| corn | | 0 | | 50 | 15 | 0 | 0–1 | 0–1 |
| corn | | 0 | | 30 | 15 | 10 | 1 | 0–1 |

The potato starch used was Toffena from Südstärke.
The corn starch used was Maize Starch from National Starch.
The glyoxal data are based on the percentage by weight of a 40% strength aqueous solution.

EXAMPLE 10
Preparation of a Thermoplastic Starch Blend Made from Potato Starch and Dialdehyde Starch A mixture made from 300 g of glycerol and 1 g of glyoxal (40% strength solution) is added to 1 kg of potato starch (potato flour, e.g. Toffena™ from Südstärke) and 100 g of dialdehyde starch (Aldrich, degree of oxidation about 90%). The mixture is mixed manually, taking into account safety regulations. The mixture prepared in this way may be used directly for further processing in an extruder.

The experiment is carried out in a twin-screw extruder (Haake Rheomex PTW 25/28p). The screws used are of standard conical design. The extruder has four variably controllable heating elements. The process temperature setting in all four zones is 140° C. The temperature curves are recorded on-line. After about 10 to 20 minutes, the actual process temperatures in all four zones are 120 +/−5° C. The temperature of material at the die is on average ten degrees Celsius higher than the temperature of the heating element. The rotation rate is 25 rpm. Discharge from the extruder is via a slot die of dimensions 100 mm in width and 0.2 mm in height (height adjustable from 0.2 to 1.0 mm).

The extruder is run with a marked overfeed, i.e. a sufficiency of material is provided at the hopper throat. In additions a ram is used to ensure continuous feed, so that material is conveyed as uniformly as possible. The ram is composed of high-performance plastic (or, if desired, wood), to avoid any abrasion of metal from tooling of this type.

After an initial running time of 10 minutes, the extrudate initially discharged from the die is milky and opaque. To begin with, the extruded foil is very flexible. The air hardens it after a short period. It is conveyed onward by way of a downstream conveyor belt. Defects can cause the extruded web to break off. The extruded foil is extensible when hot, but this property perceptibly falls away with cooling.

What is claimed is:

1. A thermoplastic mixture based on starch for producing shaped biodegradable articles with improved mechanical properties, obtainable by preparing and mixing
   A) 100 parts by weight, calculated after correction to 0% water content, of any desired starch excluding dialdehyde starch which is native and/or chemically modified, fermentative, recombinant and/or prepared by biotransformation and/or of derivatives of the starches mentioned;
   B) from 1 to 100 parts by weight of dialdehyde starch which has a degree of oxidation of more than 30% and does not exhibit any iodine-starch reaction (blue coloration);
   C) an amount of from 1 to 100 parts by weight of water;
   D) an amount within the range from 2 parts by weight up to half of the total of the parts by weight of A) and B) of at least one plasticizer;
   E) if desired, other biopolymers, and
   F) if desired, up to (A) and (B)) parts by weight of other conventional additives;
       where the mixing of components A to F takes place with introduction of thermal and mechanical energy into the thermoplastic mixture.

2. A mixture as claimed in claim 1, which comprises proteins as a further biopolymer.

3. A mixture as claimed in claim 1, which comprises, as plasticizers, polyhydroxycarboxylic acids derived from aldoses and/or from ketoses, or comprises lactones of these acids.

4. A mixture as claimed in claim 3, which comprises, as plasticizers, gluconic acid and/or gluconolactone.

5. A mixture as claimed in claim 1, wherein the dialdehyde starch has a degree of oxidation of from 70 to 95%.

6. A mixture as claimed in claim 1, wherein the proportion of dialdehyde starch is from 60 to 95 or, respectively, from 65 to 85 parts by weight.

7. A mixture as claimed in claim 1, which comprises destructured starch.

8. A mixture as claimed in claim 1, which comprises hydrolytically degraded starch.

9. A mixture as claimed in claim 1, which comprises chemically modified starch.

10. A mixture as claimed in claim 1, which comprises cationically or anionically modified starch.

11. A process for preparing compositions as claimed in claim 1, which comprises mixing dialdehyde starch, starch and/or modified starch and also, if desired, other biopolymers, water and one or more plasticizers, and also, if desired, other additives, homogenizing these in the thermoplastic state and, if desired, removing some of the water.

12. The process as claimed in claim 10, wherein the homogenization is undertaken in an extruder.

13. The process as claimed in claim 10, wherein the homogenization is undertaken in the melt.

14. A mixture as claimed in claim 1 in the form of a shaped article.

15. A mixture as claimed in claim 1 in the form of a sausage casing.

* * * * *

UNITED STATES PATENT AND TRADEMARK OFFICE
CERTIFICATE OF CORRECTION

PATENT NO.    : 6,313,105 B1                                           Page 1 of 1
DATED         : November 6, 2001
INVENTOR(S)   : Holger Bengs, Arnold Schneller, Gitte Böhm, Silke Schuth and Jürgen Grande It is certified that error appears in the above-identified patent and that said Letters Patent is hereby corrected as shown below:

Column 2,
Line 56, delete "com" and insert -- corn --.
Line 57, delete "com" and insert -- corn --.
Line 64, delete "Süidstärke" and insert -- Südstärke --.

Column 5,
Line 31, insert -- 10 -- after "to".

Signed and Sealed this

Ninth Day of April, 2002

Attest:

Attesting Officer

JAMES E. ROGAN
Director of the United States Patent and Trademark Office